(12) United States Patent  Saeki (10) Patent No.: US 10,736,122 B2
(45) Date of Patent: Aug. 4, 2020

(54) WIRELESS COMMUNICATION SYSTEM, BASE STATION, AND WIRELESS COMMUNICATION METHOD

(71) Applicant: NEC CORPORATION, Tokyo (JP)

(72) Inventor: Tomoyuki Saeki, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/138,490

(22) Filed: Sep. 21, 2018

(65) Prior Publication Data
US 2019/0104529 A1   Apr. 4, 2019

(30) Foreign Application Priority Data

Sep. 29, 2017 (JP) ................. 2017-189422

(51) Int. Cl.
| | | |
|---|---|---|
| *H04W 72/08* | (2009.01) | |
| *H04W 72/04* | (2009.01) | |
| *H04W 16/32* | (2009.01) | |
| *H04W 88/08* | (2009.01) | |
| *H04W 36/00* | (2009.01) | |
| *H04W 24/10* | (2009.01) | |
| *H04W 76/15* | (2018.01) | |
| *H04W 36/04* | (2009.01) | |

(52) U.S. Cl.
CPC ......... *H04W 72/087* (2013.01); *H04W 16/32* (2013.01); *H04W 72/0426* (2013.01); *H04W 88/08* (2013.01); *H04W 24/10* (2013.01); *H04W 36/0069* (2018.08); *H04W 36/00835* (2018.08); *H04W 36/04* (2013.01); *H04W 76/15* (2018.02)

(58) Field of Classification Search
CPC .................................................. H04W 72/087
See application file for complete search history.

(56) References Cited

U.S. PATENT DOCUMENTS

| | | | | |
|---|---|---|---|---|
| 6,032,046 A | * | 2/2000 | Nakano ................ | H04W 16/04 370/329 |
| 6,175,264 B1 | * | 1/2001 | Jinbo .................... | G11C 5/145 327/534 |
| 6,931,250 B2 | * | 8/2005 | Tamukai ............... | H04W 36/32 342/357.43 |
| 7,038,485 B2 | * | 5/2006 | Nakashima ......... | H04L 25/0278 326/16 |

(Continued)

OTHER PUBLICATIONS

"3rd Generation Partnership Project; Technical Specification Group Radio Access Network; Study on New Radio Access Technology; Radio Interface Protocol Aspects (Release 14)", 3GPP TR 38.804 v14.0.0, Technical Report, Mar. 2017, pp. 1-57.

*Primary Examiner* — Parth Patel
(74) *Attorney, Agent, or Firm* — Sughrue Mion, PLLC (57) ABSTRACT

The present invention is to enable setting of an appropriate subordinate cell or subordinate base station according to quality of a wireless communication service applied to a terminal or a type of a terminal. The terminal (3) is connected to a wireless communication network via a base station (1A), and when the base station (1A) sets another base station (1B or 1C) as the subordinate cell or the subordinate base station, the base station (1A) selects the subordinate cell or the subordinate base station from among either (a) candidates according to QoS (Quality of Service) applied to the terminal or (b) candidates according to the type of the terminal.

3 Claims, 8 Drawing Sheets

(56) References Cited

U.S. PATENT DOCUMENTS

| Patent/Publication No. | Date | Name | Classification |
|---|---|---|---|
| 7,308,015 B2 * | 12/2007 | Takano | H04W 36/30 375/130 |
| 7,460,512 B2 * | 12/2008 | Goodall | H04L 1/0002 370/332 |
| 8,711,686 B2 * | 4/2014 | Takagi | H04L 41/0659 370/218 |
| 9,098,342 B2 * | 8/2015 | Jiang | G06F 9/5061 |
| 9,497,013 B2 * | 11/2016 | Maruta | H04W 24/10 |
| 10,404,572 B1 * | 9/2019 | Fuste Vilella | H04W 40/00 |
| 2001/0014607 A1 * | 8/2001 | Furukawa | H04W 36/18 455/436 |
| 2006/0046765 A1 * | 3/2006 | Kogure | H04W 52/28 455/522 |
| 2007/0111757 A1 * | 5/2007 | Cao | H04L 47/14 455/561 |
| 2009/0010164 A1 * | 1/2009 | Wang | H04W 72/0486 370/235 |
| 2009/0288052 A1 * | 11/2009 | Sunohara | G06F 17/5031 716/113 |
| 2010/0177686 A1 * | 7/2010 | Abeille | H04W 40/36 370/328 |
| 2010/0208662 A1 * | 8/2010 | Fuste Vilella | H04W 40/00 370/328 |
| 2010/0248643 A1 * | 9/2010 | Aaron | H04L 1/0002 455/68 |
| 2011/0243262 A1 * | 10/2011 | Ratasuk | H04L 5/003 375/260 |
| 2011/0306370 A1 * | 12/2011 | Zhao | G01S 5/18 455/500 |
| 2012/0251117 A1 * | 10/2012 | Patel | H04J 14/0224 398/79 |
| 2013/0191314 A1 * | 7/2013 | Li | G06N 5/04 706/46 |
| 2013/0195112 A1 * | 8/2013 | Morita | H04L 41/28 370/400 |
| 2014/0098674 A1 * | 4/2014 | Sonoda | H04L 49/3009 370/238 |
| 2015/0043911 A1 * | 2/2015 | Patel | H04J 14/0257 398/48 |
| 2015/0195671 A1 * | 7/2015 | Seed | H04W 4/70 455/434 |
| 2015/0270877 A1 * | 9/2015 | Hessler | H04B 7/024 370/329 |
| 2015/0271749 A1 * | 9/2015 | Lu | H04W 48/18 455/437 |
| 2016/0021639 A1 * | 1/2016 | Ma | H04W 52/0216 455/458 |
| 2016/0072894 A1 * | 3/2016 | Mishra | H04L 41/5054 709/226 |
| 2016/0205693 A1 * | 7/2016 | Lu | H04W 48/18 370/329 |
| 2016/0330647 A1 * | 11/2016 | Iwai | H04W 28/0268 |
| 2017/0303245 A1 * | 10/2017 | Asterjadhi | H04L 43/0894 |
| 2018/0091379 A1 * | 3/2018 | Li | H04L 41/0816 |
| 2018/0103380 A1 * | 4/2018 | Ode | H04W 16/14 |
| 2018/0249430 A1 * | 8/2018 | Moosavi | H04W 56/001 |
| 2018/0270696 A1 * | 9/2018 | Duan | H04W 48/02 |
| 2018/0279218 A1 * | 9/2018 | Park | H04W 36/08 |
| 2018/0317106 A1 * | 11/2018 | Konstantinou | H04W 24/04 |
| 2018/0343608 A1 * | 11/2018 | Duan | H04W 48/16 |
| 2019/0007977 A1 * | 1/2019 | Asterjadhi | H04W 74/0833 |
| 2019/0082366 A1 * | 3/2019 | Miao | H04W 76/10 |
| 2019/0104529 A1 * | 4/2019 | Saeki | H04W 16/32 |
| 2019/0306725 A1 * | 10/2019 | Ravikiran | H04B 7/0617 |

* cited by examiner

WIRELESS COMMUNICATION SYSTEM, BASE STATION, AND WIRELESS COMMUNICATION METHOD

This application is based upon and claims the benefit of priority from Japanese patent application No. 2017-189422, filed on Sep. 29, 2017, the disclosure of which is incorporated herein in its entirety by reference.

TECHNICAL FIELD

The present invention relates to a wireless communication system, a base station, and a method for controlling a wireless communication system and relates to, for example, a technology for forming a heterogeneous network.

BACKGROUND ART

There are some wireless communication networks in which a part or all of communication areas (cells) covered by a plurality of base stations overlap each other. Such network is called a heterogeneous network.

In the heterogeneous network, in a communication area (macro cell) of one base station, communication areas (pico cells, femtocells) covered by one or more other base stations are deployed. In this specification, the former (the one base station) is called a main base station and the latter (the other base stations) are called subordinate base stations.

The main base station is a MN (master node). The MN is directly connected to a MME (Mobility Management Entity) (not shown). The MN can set one or more base stations as the subordinate base station (SN; second node) according to needs (for example, increase in data traffic). The SN is indirectly connected to the MME via the MN.

By using a DC (dual connectivity) technology, one or both of the MN and the SN can simultaneously provide a communication resource to one terminal.

CITATION LIST

Non-Patent Literature

[Non-Patent Literature 1]
3 GPP TR38.804 (V14.0.0) 10.3 (Mar. 20, 2017)

Technical Problem

A future standard (non-patent literature 1) for a wireless communication network is being produced by the 3GPP (Third Generation Partnership Project).

According to the standard mentioned above, in the future wireless communication network, the SN leads movement (mobility) management of a terminal. Accordingly, for setting a second SN after setting a first SN, the first SN selects the subordinate base station to be added as the second SN.

However, in the above-mentioned standard (non-patent literature 1), a method for selecting the second SN is not described. Accordingly, the appropriate second SN cannot be selected from among a large number of subordinate base stations.

Further, it is requested to set a specified subordinate base station to the SN according to the wireless communication service used by the terminal or a type of the terminal and conversely, it is requested not to set a specified subordinate base station to the SN. Accordingly, it is required to establish a guideline for meeting such requests.

An object of the present invention is to enable setting of an appropriate subordinate cell or subordinate base station according to quality of a wireless communication service applied to a terminal or a type of a terminal.

SUMMARY

An aspect of the invention is a wireless communication system. The wireless communication system includes a plurality of base stations performing the wireless communication with a terminal, wherein the base station includes a first base station set as a node of the wireless communication network, and for setting another base station as a subordinate cell or a subordinate base station, the first base station selects the subordinate cell or the subordinate base station from among either (a) candidates according to QoS (Quality of Service) applied to the terminal or (b) candidates according to a type of the terminal.

An aspect of the invention is a base station which composes a cellular type wireless communication network together with another base station. The base station the base station performs wireless communication with a terminal, and is set as a node of the wireless communication network. And for setting another base station as a subordinate cell or a subordinate base station in the wireless communication network, the base station selects the subordinate cell or the subordinate base station from among either (a) candidates according to QoS applied to the terminal or (b) candidates according to a type of the terminal.

An aspect of the invention is a method for controlling a wireless communication system. The wireless communication system includes a plurality of base stations and forms a cellular type wireless communication network. The method for controlling the wireless communication system comprises performing, by a plurality of the base stations, wireless communication with a terminal, setting a first base station as a node of the wireless communication network, and for setting another base station as a subordinate cell or a subordinate base station, selecting the subordinate cell or the subordinate base station from among either (a) candidates according to QoS applied to the terminal or (b) candidates according to a type of the terminal.

An aspect of the invention is a non-transitory recording medium storing a program for controlling operation of the wireless communication system by a computer.

Advantageous Effects of Invention

By using one aspect described above, an appropriate subordinate cell or subordinate base station can be set according to quality of a wireless communication service applied to a terminal or a type of a terminal.

EXAMPLE EMBODIMENT

Example Embodiment 1

An example embodiment 1 of the present invention will be described with reference to FIGS. 1 to 4.

Configuration

Figure 1:
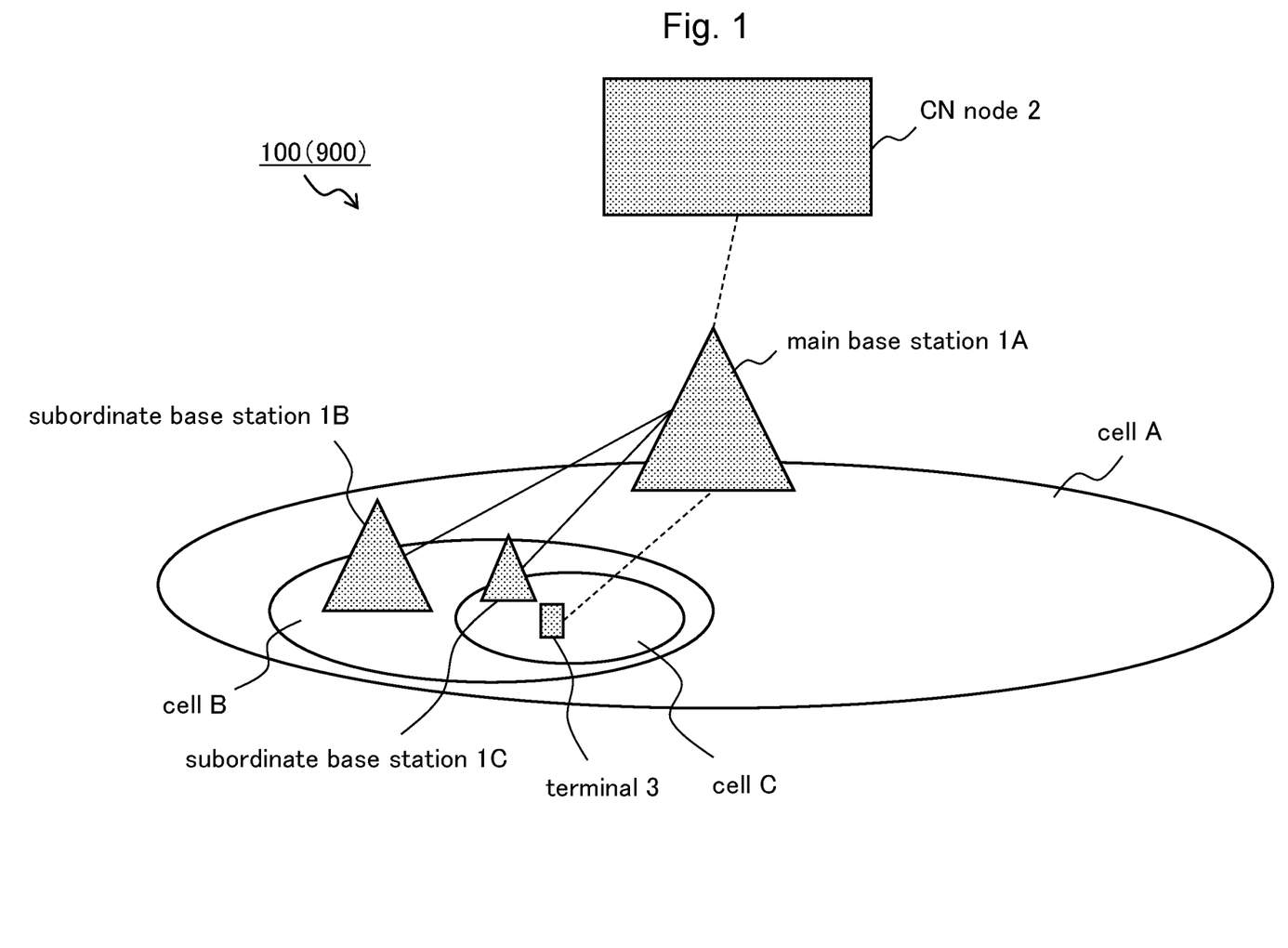
FIG. 1 schematically shows a configuration of a wireless communication system according to example embodiments 1 to 4.
Figure 2:
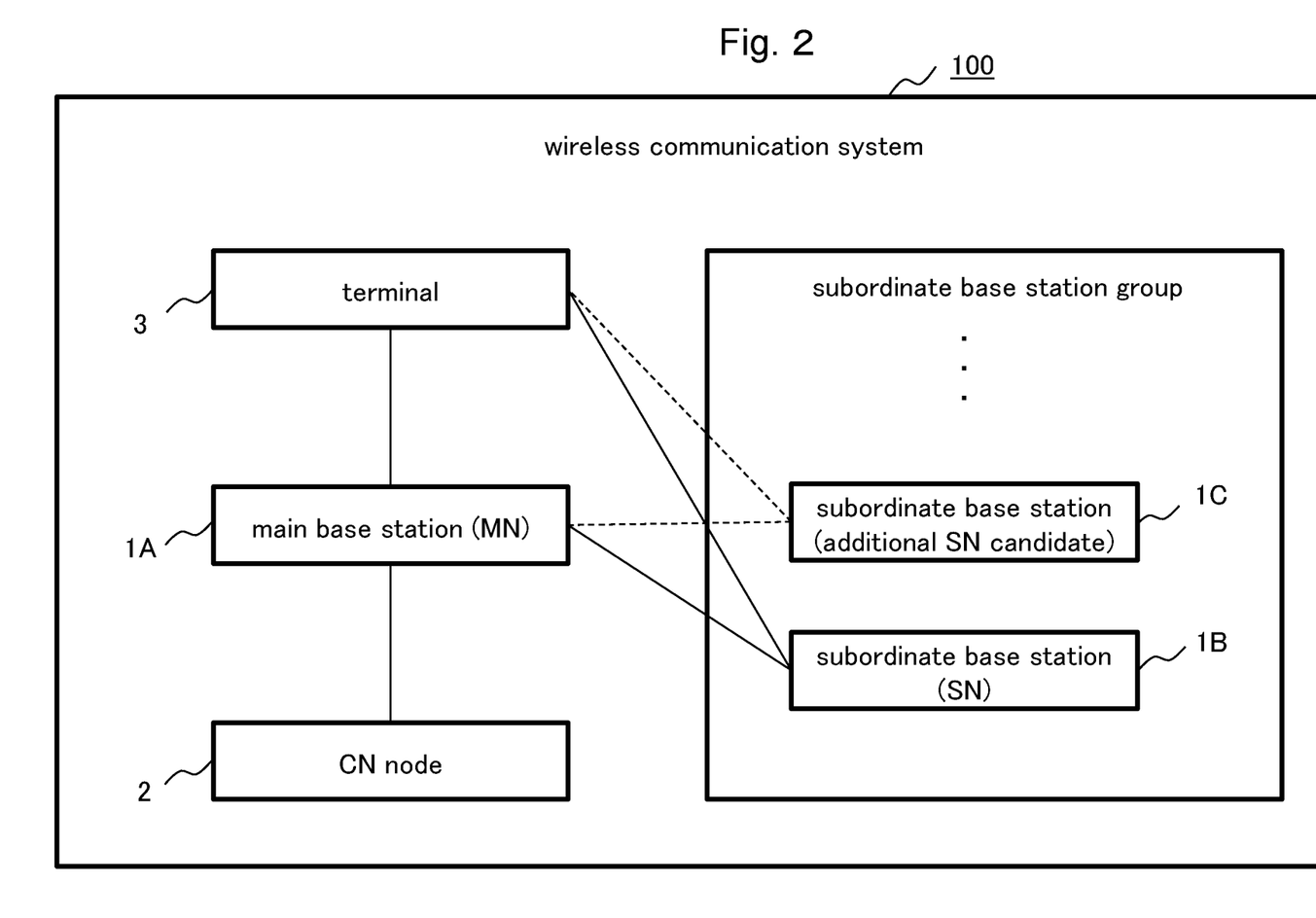
FIG. 2 is a block diagram showing a configuration of a wireless communication system according to example embodiments 1 to 4.

A wireless communication system 100 according to the example embodiment 1 will be described with reference to FIG. 1 and FIG. 2. FIG. 1 schematically shows a configuration of the wireless communication system 100. FIG. 2 is a block diagram of the wireless communication system 100.

As shown in FIG. 1 and FIG. 2, the wireless communication system 100 includes base stations 1A to 1C, a CN (Core Network) node 2, and a terminal 3.

The wireless communication system 100 complies with an arbitrary wireless communication standard. The wireless communication system 100 may comply with the wireless communication standard, such as, HSPA+ (High Speed Packet Access), WiMAX, WiMAX2, LTE (Long Term Evolution), or LTE-Advanced.

The wireless communication system 100 forms a so-called cellular type wireless communication network. The base stations 1A to 1C included in the wireless communication system 100 have specific communication areas (cells), respectively. As shown in FIG. 2, the wireless communication system 100 may include more subordinate base stations.

The communication area of the base station 1A is called a cell A. The communication areas of base stations 1B and 1C are called a cell B and a cell C, respectively. As shown in FIG. 1, the sizes of the cell B and the cell C are smaller than that of the cell A, and the cell B and the cell C are placed in the cell A. When such relationship is satisfied, the base station 1A is called the main base station and the base stations 1B and 1C are called the subordinate base station of the main base station 1A. Further, an inclusive relationship among three cells A, B, and C shown in FIG. 1 is only shown as an example. The sizes of the cells B and C may be greater than that of the cell A. Further, in FIG. 1, the inclusive relationship between the cell B and the cell C may be reversed (in other words, the size of the cell C is greater than that of the cell B).

The main base station 1A is the MN (master node). As shown in FIG. 2, the main base station 1A is directly connected to the CN node 2 and the MME (Mobility Management Entity). On the other hand, the subordinate base stations 1B and 1C are connected to the CN node 2 and the MME via the main base station 1A indirectly.

According to the needs, the main base station 1A sets the subordinate base stations 1B and 1C as the SN (secondary node). A method of which the MN sets the SN is not described in this example embodiment 1 because it will be described in an example embodiment 5 described later.

A condition used when the MN sets the SN is not limited especially. For example, when a data communication amount processed by the MN exceeds a threshold value, the MN may set the SN.

The terminal 3 has a wireless communication function complying with the wireless communication standard (mentioned above) used for the wireless communication system 100. The terminal 3 is connected to a core network (for example, a telephone line network or Internet) of the wireless communication system 100 via the main base station 1A, the subordinate base station 1B, or the subordinate base station 1C.

The terminal 3 may be, for example, a smartphone, a tablet terminal, an electronic book reader, or a portable game machine.

Figure 3:
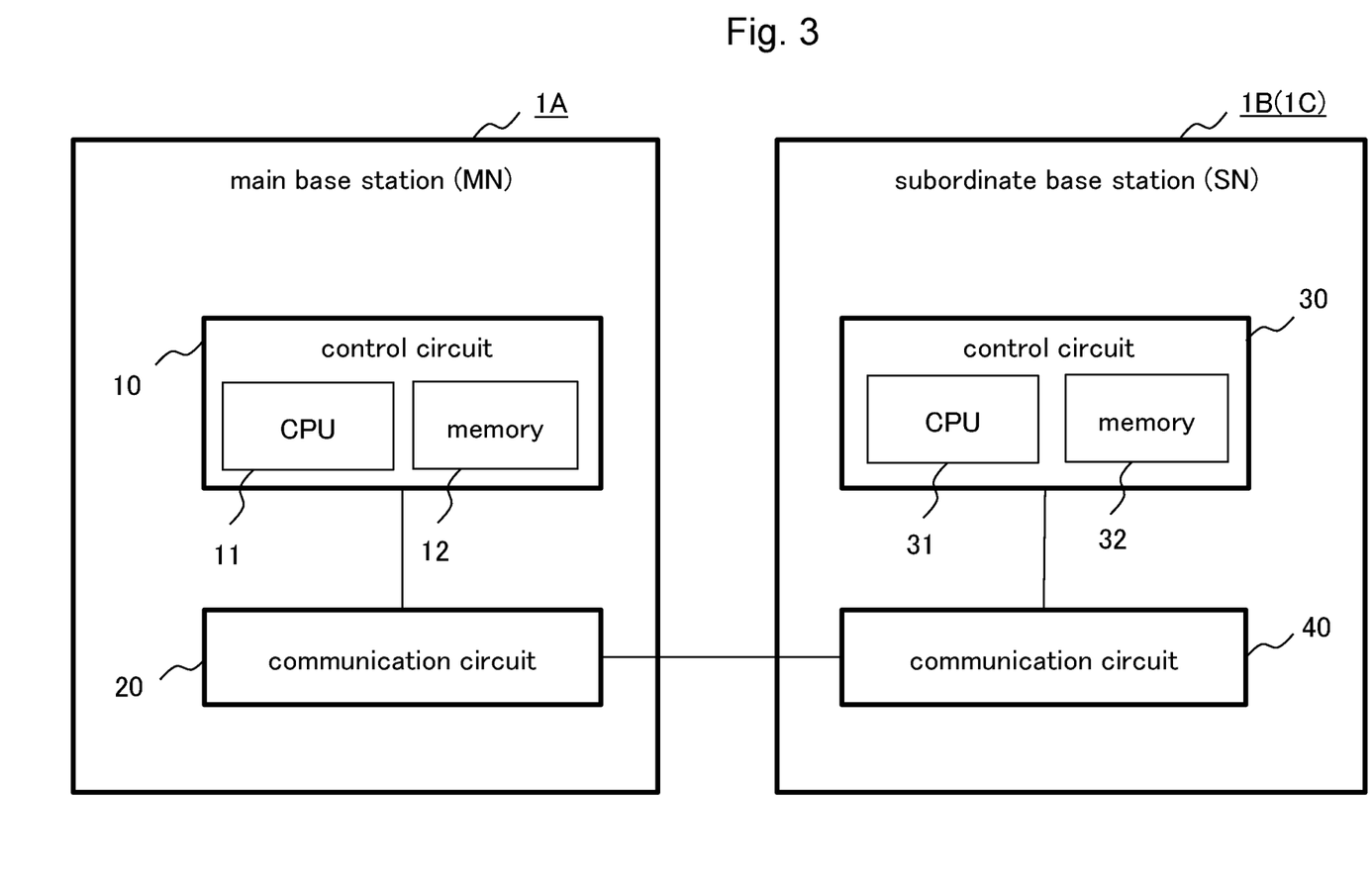
FIG. 3 is a block diagram showing a configuration of a main base station and a subordinate base station included in a wireless communication system according to example embodiments 1 to 4.

FIG. 3 is a block diagram showing a configuration of the main base station 1A and the subordinate base stations 1B and 1C. As shown in FIG. 3, the main base station 1A includes a control circuit 10 and a communication circuit 20. The control circuit 10 includes a CPU (Central Processing Unit) 11 and a memory 12. The CPU 11 executes a program that is read and stored in the memory 12 and controls the main base station 1A so as to operate in accordance with an operation flow described later. The communication circuit 20 functions to establish a wireless connection between the main base station 1A and the subordinate base stations 1B and 1C.

As shown in FIG. 3, the subordinate base stations 1B and 1C also include a control circuit 30 and a communication circuit 40. The control circuit 30 includes a CPU 31 and a memory 32. The CPU 31 executes a program that is read and stored in the memory 32 and controls the subordinate base stations 1B and 1C so as to operate in accordance with the operation flow described later. The communication circuit 40 cooperates with the communication circuit 20 of the main base station 1A and functions to establish a wireless connection between the main base station 1A and the subordinate base stations 1B and 1C.

Operation Flow

Figure 4:
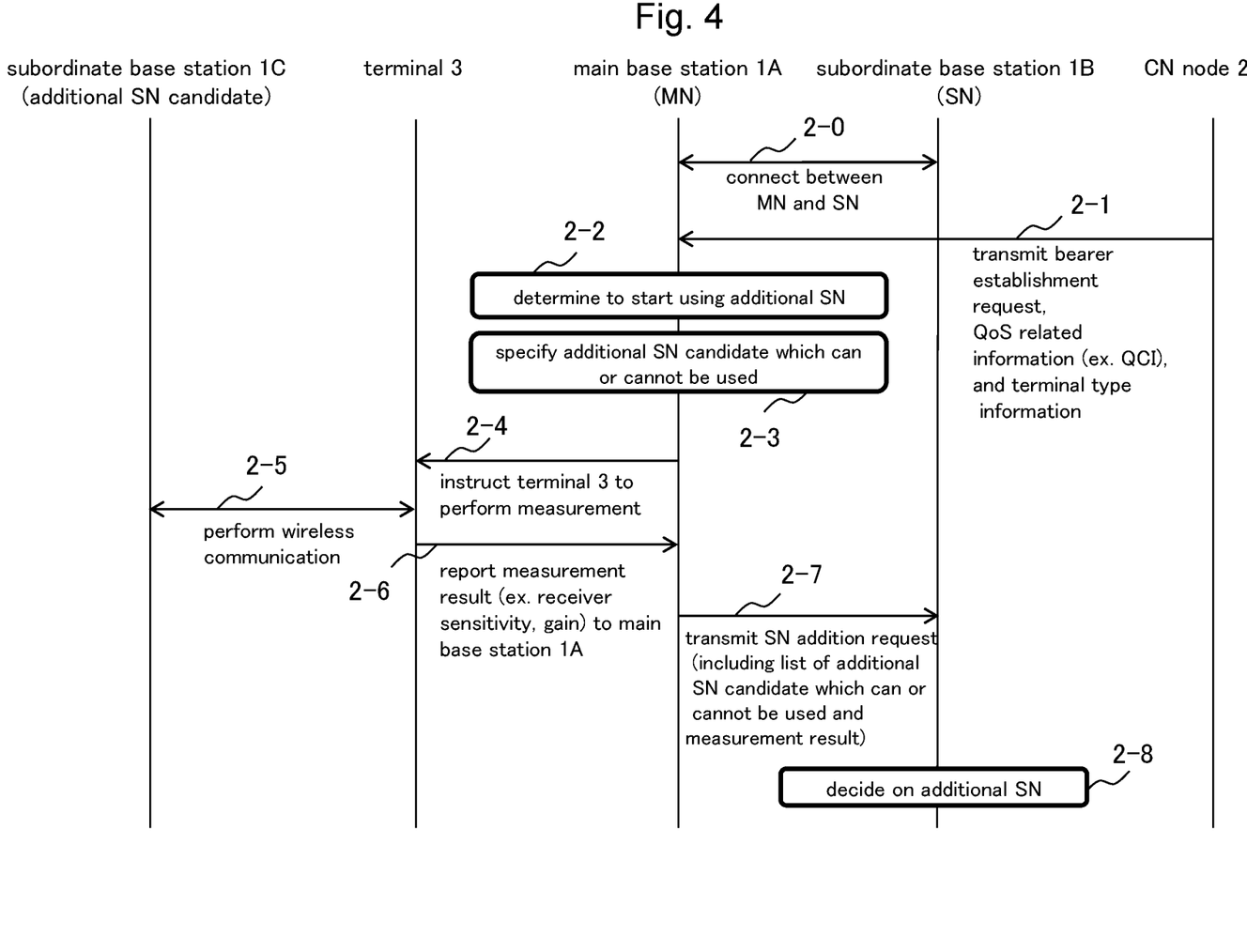
FIG. 4 is a sequence diagram showing a flow of operation of each component of a wireless communication system according to example embodiment 1.

An operation flow of the wireless communication system 100 according to this example embodiment 1 will be described with reference to FIG. 4. FIG. 4 is a sequence diagram showing a flow of operation of each of the components (the main base stations 1A to 1C, the CN node 2, and the terminal 3) included in the wireless communication system 100.

In this example embodiment 1, it is assumed that the wireless connection between the MN (the main base station 1A) and the SN (the subordinate base station 1B; a first SN) has been already established (step 2-0).

As shown in FIG. 4, when the terminal 3 enters the cell of the main base station 1A, the CN node 2 transmits a request to establish a wireless bearer between the terminal 3 and the main base station 1A to the main base station 1A (step 2-1). Briefly speaking, the bearer is a communication route.

Further, the CN node 2 notifies the main base station 1A of information (for example, QCI (QoS Class Identifier)) related to QoS (Quality of Service) applied to wireless communication with the terminal 3. The QoS is determined on the basis of, for example, a type of the terminal 3 or a contractual coverage of the wireless communication service related to the terminal 3.

The QoS represents a level of quality of the wireless communication service provided by the wireless communication system 100. The quality of the wireless communication service includes, for example, a bandwidth of a communication resource that is provided and a real time characteristic of communication.

The CN node 2 may transmit information about the type of the terminal 3, information about an attribute of the terminal 3, and/or information about a user attribute to the main base station 1A.

The communication circuit 20 of the main base station 1A establishes the bearer connecting the main base station 1A, the subordinate base station 1B, and the terminal 3 according to the request from the CN node 2 and then, the communication circuit 20 of the main base station 1A starts wireless communication with the terminal 3.

The control circuit 10 of the main base station 1A determines to start using an additional SN (a second SN) on the basis of a condition (step 2-2). The control circuit 10 of the main base station 1A may detect a data traffic in the communication circuit 20, and determine to use one or more additional SNs when an amount of the data traffic rapidly increases. In this case, as the condition, for example, a condition that the data communication amount processed by the main base station 1A exceeds a threshold value may be used. However, another condition may be used. For example, a condition that the throughput of the CPU 11 of the main base station 1A exceeds a threshold value or a condition that a use amount of the memory 12 exceeds a threshold value may be used as the condition.

After determining to start using the additional SN, the control circuit 10 of the main base station 1A selects an additional SN candidate from among the subordinate base stations (including the subordinate base station 1C) (step 2-3).

Specifically, the control circuit 10 of the main base station 1A scans a subordinate base station list obtained from a management server or the MME (not shown) in advance. At least information (hereinafter, referred to as QoS related information) related to quality (QoS) of the wireless communication service which can be provided by each subordinate base station is written in the subordinate base station list.

The control circuit 10 of the main base station 1A selects one or more subordinate base stations as the additional SN candidate from among the subordinate base stations written in the subordinate base station list on the basis of the QoS related information written in the subordinate base station list. For example, the control circuit 10 of the main base station 1A obtains information of a band of a communication resource which can be obtained as the QoS related information written in the subordinate base station list. The control circuit 10 of the main base station 1A may select, as the additional SN candidate, one or more subordinate base stations which can provide the communication resource whose receiver sensitivity or gain in the terminal 3 is greater than a reference value.

Next, the control circuit 10 of the main base station 1A requests the terminal 3 to perform wireless communication between each of selected additional SN candidate(s) and the terminal 3 and further requests the terminal 3 to report (transmit) a measurement value (for example, the receiver sensitivity or the gain) related to QoS obtained as a result of the wireless communication to the control circuit 10 of the main base station 1A (step 2-4).

The terminal 3 performs wireless communication with each additional SN candidate and measures a value related to QoS according to the request from the main base station 1A (step 2-5). The terminal 3 reports information about each additional SN candidate and a measurement value (a measurement result) of each additional SN candidate to the main base station 1A (step 2-6).

After the control circuit 10 of the main base station 1A receives the measurement result from the terminal 3, the control circuit 10 of the main base station 1A creates a list including the additional SN candidate which can or cannot be used by the terminal 3 on the basis of the measurement result, and determines whether or not the additional SN candidate which is included in the list and can be used is the subordinate base station existing in the communication area covered by the SN (in this case, the base station 1B).

When the additional SN candidate which can be used is the subordinate base station of the SN (in this case, the base station 1B), the communication circuit 20 of the main base station 1A transmits a SN addition request to the subordinate base station 1B (step 2-7).

The SN addition request includes a list including the additional SN candidate which can or cannot be used. When the control circuit 30 of the subordinate base station 1B receives the SN addition request from the main base station 1A, the control circuit 30 of the subordinate base station 1B determines the additional SN by referring to the list including the additional SN candidate which can or cannot be used included in the request (step 2-8).

For example, the control circuit 30 of the subordinate base station 1B may select the additional SN candidate with the best measurement value related to QoS from among the additional SN candidates which are included in the list and can be used as the additional SN. Alternatively, the control circuit 30 of the subordinate base station 1B may receive the list including the additional SN candidate which cannot be used from the main base station 1A, receive the list including only the additional SN candidate which can be used, and select the additional SN candidate with the best measurement value related to QoS from among the additional SN candidates included in the received list as the additional SN.

When the above-mentioned process has been performed, the processes shown in the operation flow of this example embodiment 1 end.

Additional SN Candidate which can or Cannot be Used

Figure 5:
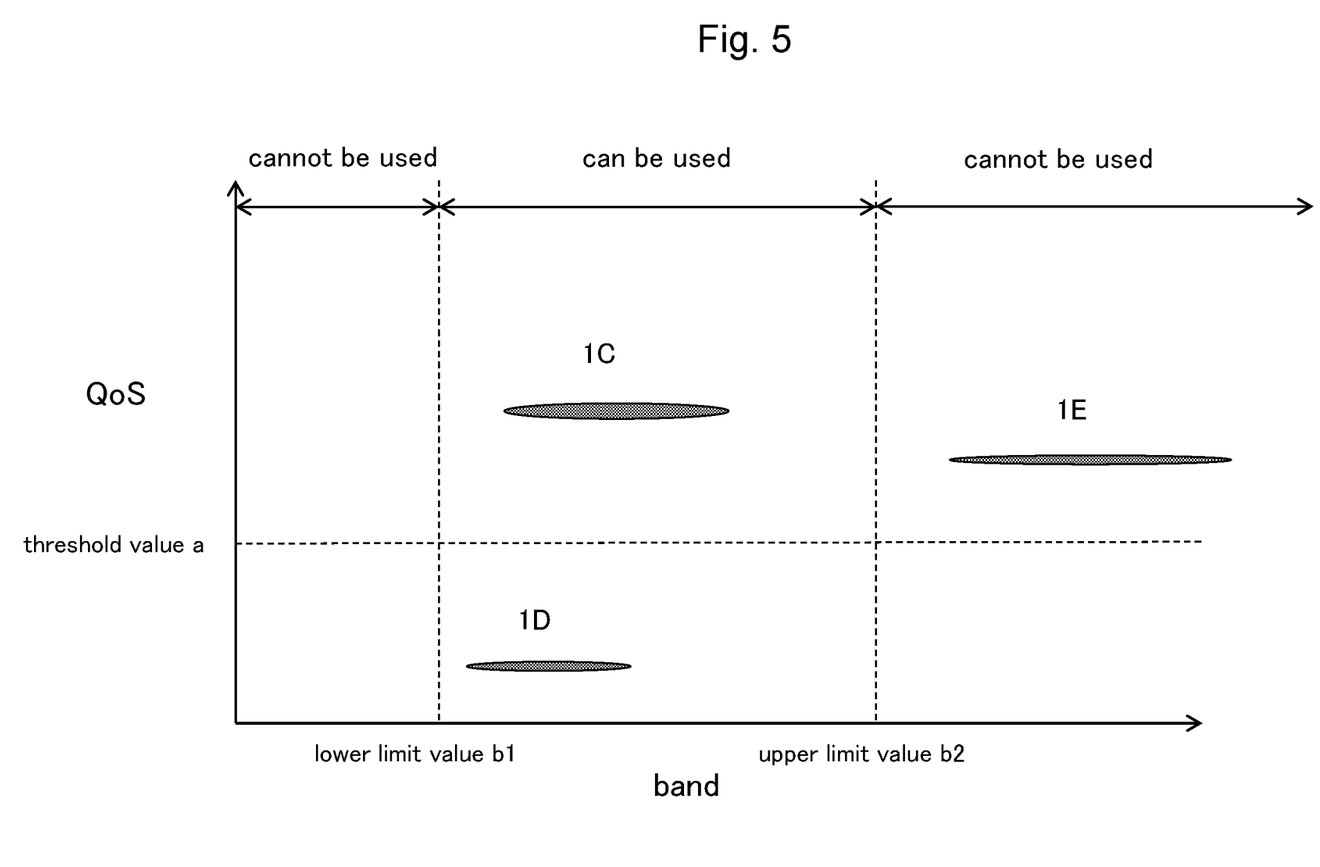
FIG. 5 is a graph of QoS versus band and shows a condition in which a SN can or cannot be selected as an additional SN candidate.

The above-mentioned additional SN candidate which can or cannot be used will be described with reference to a graph shown in FIG. 5. FIG. 5 is a graph of QoS (or a value related to QoS) versus band. In the graph shown in FIG. 5, with respect to the subordinate base stations 1C to 1E, the values of QoS and band of the communication resource which can be provided by these subordinate base stations 1B to 1F are plotted in FIG. 5.

In this example embodiment, the additional SN candidate which can be used is the subordinate base station which meets the condition that it can provide a communication resource of which the value of QoS is greater than a threshold value a and the value of band is between a lower limit value b1 and an upper limit value b2 in FIG. 5. Conversely, the subordinate base station which does not meet the above-mentioned condition is not appropriate for the additional SN. Accordingly, such subordinate base station is the additional SN candidate which cannot be used.

In FIG. 5, because the subordinate base station 1C meets the above-mentioned condition, the subordinate base station 1C is the additional SN candidate which can be used. On the other hand, because subordinate base stations 1D and 1E do not meet the above-mentioned condition, these subordinate base stations 1D and 1E are the additional SN candidates which cannot be used as the additional SN.

Effect of Example Embodiment 1

In the configuration of this example embodiment 1, the list including the additional SN candidate which can or cannot be used is transmitted to the SN (the subordinate base station) from the MN (the main base station 1A). Accordingly, the SN (the subordinate base station) can set the additional SN (the base station 1C) by referring to the list including the additional SN candidate which can or cannot be used.

The list including the additional SN candidate which can or cannot be used includes information related to the additional SN candidate which can provide the required QoS. Therefore, even when the SN (the subordinate base station) selects any additional SN from the list including the additional SN candidate, the selected additional SN can provide the required level of QoS to the terminal 3.

Example Embodiment 2

The configuration of the wireless communication system 100 according to this example embodiment 2 is the same as that of the wireless communication system 100 according to the example embodiment 1. However, operation of the subordinate base station 1B according to the example embodiment 2 is different from that of the subordinate base station 1B according to the example embodiment 1.

Specifically, in the example embodiment 2, the control circuit 30 of the subordinate base station 1B continues to hold the list including the additional SN candidate which can or cannot be used that is received from the main base station 1A in step 2-7 after setting the additional SN in step 2-8 of the operation flow shown in FIG. 4. The period during which the control circuit 30 of the subordinate base station 1B continues to hold the list including the additional SN candidate which can or cannot be used is not determined especially.

After this process, when it is required to additionally set the additional SN because of, for example, the increase in data traffic, the control circuit 30 of the subordinate base station 1B selects the subordinate base station to be set as the additional SN from the holding list including the additional SN candidate.

Effect of Example Embodiment 2

In the configuration of this example embodiment 2, once the SN (the subordinate base station 1B) receives the list including the additional SN candidate which can or cannot be used from the MN (the main base station 1A), the SN stores the received list. Accordingly, when it is required to additionally set the additional SN, it is not necessary for the SN (the subordinate base station 1B) to receive the list including the additional SN candidate from the MN (the main base station 1A) again.

Accordingly, the wireless communication between the MN (the main base station 1A) and the SN (the subordinate base station 1B) can be reduced and the process of which the SN (the subordinate base station 1B) decides on the additional SN can be efficiently performed.

Example Embodiment 3

The configuration of the wireless communication system 100 according to this example embodiment 3 is the same as that of the wireless communication system 100 according to the example embodiment 1 or the example embodiment 2. However, operation of the MN (the main base station 1A) according to the example embodiment 3 is different from that of the MN (the main base station 1A) according to the example embodiments 1 and 2.

In this example embodiment 3, in step 2-7 of the operation flow shown in FIG. 4, the MN (the main base station 1A) does not transmit the list including the additional SN candidate which can or cannot be used to the SN (the subordinate base station 1B). Instead of transmitting the list, the MN (the main base station 1A) transmits information (hereinafter, referred to as determination information) required for determining the additional SN candidate which can or cannot be used to the subordinate base station 1B.

The determination information may be a first mapping table (mapping information) in which, for example, a correspondence relationship between a rank or level of the required QoS and the subordinate base station which can provide QoS with the required rank or level is described. Alternatively, the determination information may be a second mapping table (mapping information) in which a correspondence relationship between a type of the terminal and the subordinate base station which can achieve the QoS level required by the terminal of that type is described.

When the determination information is the former (the first mapping table), the additional SN candidate can be selected according to the QoS applied to the terminal. When the determination information is the latter (the second mapping table), the additional SN candidate can be selected according to the type of the terminal. By using at least one of the first and second mapping tables, the wireless communication service with the required quality level can be provided to the terminal.

Operation Flow

Figure 6:
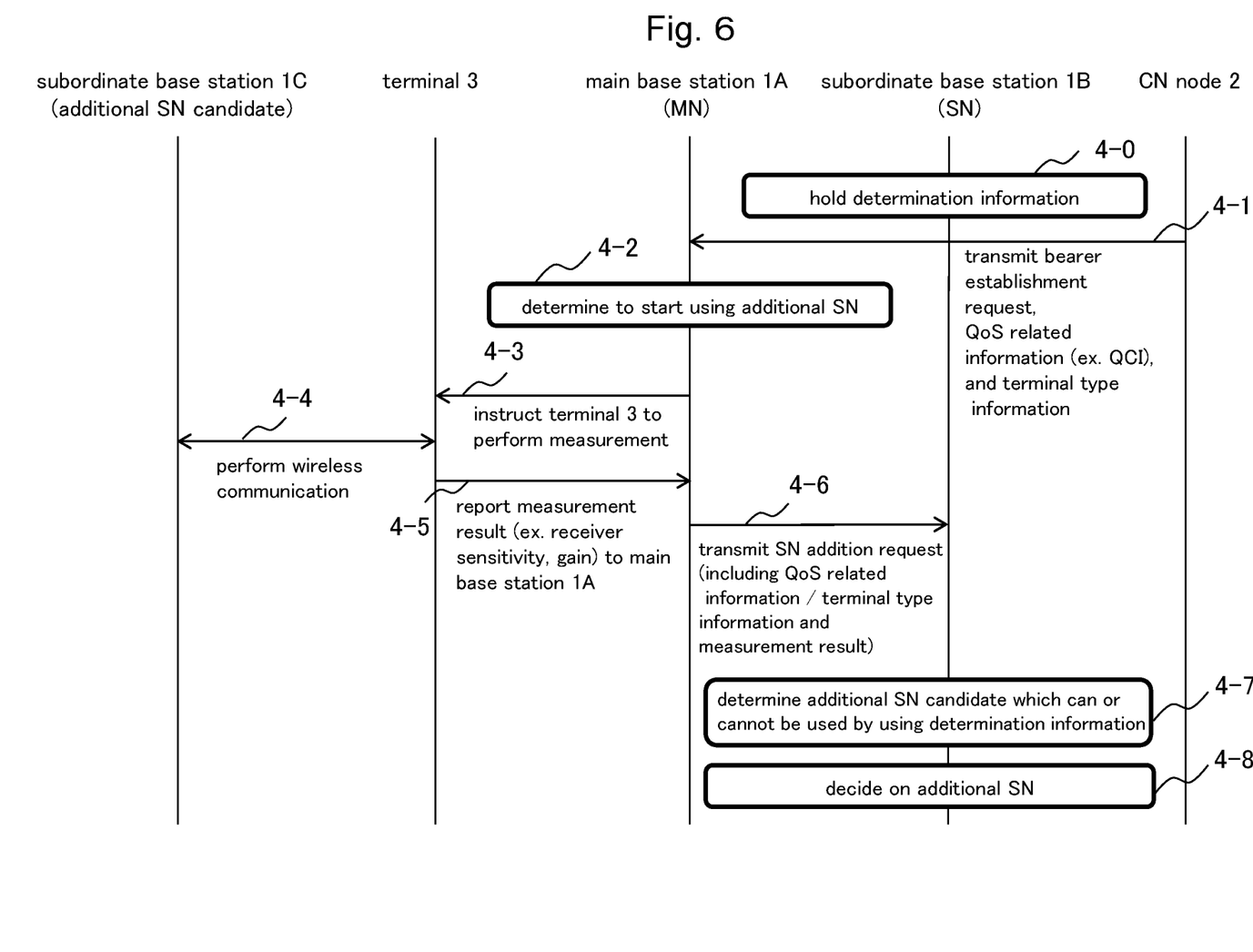
FIG. 6 is a sequence diagram showing a flow of operation of each component of a wireless communication system according to example embodiment 3.

FIG. 6 is a sequence diagram showing a flow of operation of each of the components (the main base stations 1A to 1C, the CN node 2, and the terminal 3, refer to FIG. 1) included in the wireless communication system 100 according to this example embodiment 3.

In this example embodiment 3, it is assumed that the wireless connection between the MN (the main base station 1A) and the SN (the subordinate base station 1B) has been already established. In FIG. 6, the sequence to establish the wireless connection is not shown.

As shown in FIG. 6, the control circuit 30 of the subordinate base station 1B holds the determination information mentioned above (step 4-0). For example, the communication circuit 40 of the subordinate base station 1B may obtain the determination information from the main base station 1A in advance after the wireless connection between the main base station 1A and the subordinate base station 1B is established.

As shown in FIG. 6, the CN node 2 transmits the request to establish a wireless bearer to the main base station 1A (step 4-1).

The control circuit 10 of the main base station 1A determines to start using the additional SN on the basis of the condition (step 4-2). Even in this example embodiment 3, the condition is not limited.

Next, the control circuit 10 of the main base station 1A requests the terminal 3 to perform wireless communication between each selected additional SN candidate and the terminal 3, and report the measurement value (for example, the receiver sensitivity or the gain) related to QoS obtained as a result of the wireless communication to the control circuit 10 of the main base station 1A (step 4-3).

The terminal 3 performs wireless communication with each additional SN candidate and measures a value indicating QoS corresponding to each additional SN candidate according to the request received from the main base station 1A. The terminal 3 reports a measurement result of the value indicating QoS corresponding to each additional SN candidate to the main base station 1A (step 4-4).

After receiving the report from the terminal 3, the communication circuit 20 of the main base station 1A transmits the SN addition request to the SN (in this case, the base station 1B) (step 4-6). The SN addition request includes the measurement result being a value indicating QoS and the QoS related information. The QoS related information is also called first information.

Alternatively, the SN addition request may include the information about the type of the terminal 3 instead of the QoS related information. The information about the type of the terminal 3 is also called second information.

The control circuit 30 of the subordinate base station 1B determines the additional SN candidate which can or cannot be used on the basis of the information included in the SN addition request received from the main base station 1A and the determination information held in advance (step 4-7).

After this process, the control circuit 30 of the subordinate base station 1B decides on the additional SN (in this case, the subordinate base station 1C) by using the information about the additional SN candidate which can or cannot be used that is obtained by the decision (step 4-8). For example, the control circuit 30 of the subordinate base station 1B may select the additional SN candidate with the best measurement value related to QoS from among the additional SN candidates which can or cannot be used as the additional SN.

When the above-mentioned process has been performed, the processes shown in the operation flow of this example embodiment 3 end.

Effect of this Example Embodiment 3

In the configuration of this example embodiment 3, the SN (the subordinate base station 1B) holds the determination information in advance.

Accordingly, the SN (the subordinate base station 1B) can determine the additional SN candidate on the basis of the determination information without receiving the list including the additional SN candidate which can or cannot be used from the MN (the main base station 1A) after the MN (the main base station 1A) determines the use of the additional SN.

Example Embodiment 4

In this example embodiment 4, after wireless communication is established between the MN (the main base station 1A) and the SN (the subordinate base station 1B), the MN (the main base station 1A) transmits the information required for determining the additional SN candidate which can or cannot be used, in other words, the determination information described in the example embodiment 3, to the subordinate base station 1B. In this example embodiment 4, the determination information is not explained again and the example is not shown.

Operation Flow

Figure 7:
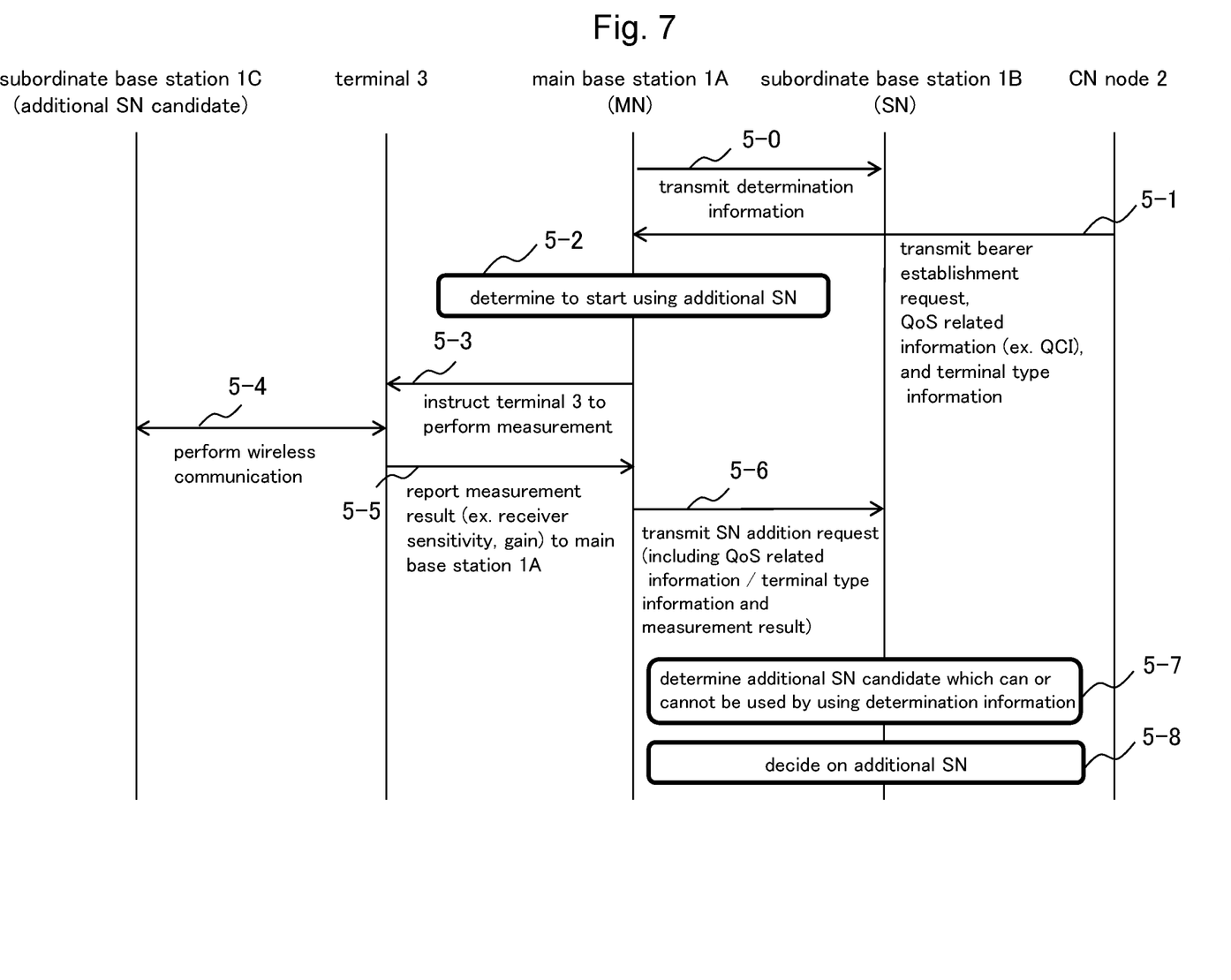
FIG. 7 is a sequence diagram showing a flow of operation of each component of a wireless communication system according to example embodiment 4.

FIG. 7 is a sequence diagram showing a flow of operation of each of the components (the main base stations 1A to 1C, the CN node 2, and the terminal 3) included in the wireless communication system 100 according to this example embodiment 4.

In this example embodiment 4, it is assumed that at first, wireless communication is not established between the main base station 1A and the subordinate base station 1B. In other words, no SN is set at the beginning.

As shown in FIG. 7, when the communication circuit 20 of the main base station 1A determines that it is necessary to set the SN, the communication circuit 20 of the main base station 1A cooperates with the communication circuit 40 of the subordinate base station 1B and establishes wireless communication. In this case, the communication circuit 20 of the main base station 1A transmits the determination information mentioned above to the subordinate base station 1B (step 5-0).

As shown in FIG. 7, the processes performed in step 5-1 to step 5-6 of the operation flow of this example embodiment 4 are the same as the processes performed in step 4-1 to step 4-6 of the operation flow described in the example embodiment 3. Accordingly, the description of the processes performed in step 5-1 to step 5-6 will be omitted in this example embodiment 4.

In the operation flow of this example embodiment 4, in step 5-6, the communication circuit 40 of the subordinate base station 1B receives the SN addition request from the main base station 1A.

Even in this example embodiment 4, the SN addition request includes the QoS related information that is an example of the first information and the information about the measurement value related to QoS received from the terminal 3 like the example embodiment 3. Alternatively, the SN addition request may include the information about the type of the terminal 3 that is an example of the second information instead of the QoS related information.

The control circuit 30 of the subordinate base station 1B determines the additional SN candidate which can or cannot be used on the basis of the information included in the SN addition request received from the main base station 1A and the determination information obtained from the main base station 1A in step 5-0 (step 5-7).

After this process, the control circuit 30 of the subordinate base station 1B decides on the additional SN (in this case, the subordinate base station 1C) by using the information about the additional SN candidate which can or cannot be used that is obtained by the determination (step 5-8). For example, the control circuit 30 of the subordinate base station 1B may select the additional SN candidate which can provide the communication resource with high receiver sensitivity or high gain by the terminal 3 from among the additional SN candidates which can be used as the additional SN. However, in this configuration, it is necessary for the communication circuit 40 of the subordinate base station 1B to obtain the information about the additional SN candidate which can provide the communication resource with high receiver sensitivity or high gain by the terminal 3 from the terminal 3 or the main base station 1A in advance.

When the above-mentioned process has been performed, the processes shown in the operation flow of this example embodiment 4 end.

Effect of this Example Embodiment 4

In the configuration of this example embodiment 4, before the SN (the subordinate base station 1B) sets the additional SN, the SN receives the determination information from the MN (the main base station 1A) in advance. Accordingly, when the SN (the subordinate base station 1B) receives the SN addition request from the MN (the main base station 1A), the SN can determine one or more additional SN candidates by using the determination information. Further, the SN (the subordinate base station 1B) can select the additional SN (the subordinate base station 1C) from among the additional SN candidates determined by the SN itself.

Example Embodiment 5

In the example embodiments 1 to 4, the configuration in which two SNs are set has been described. However, the present invention can be applied to a configuration in which only one SN is set.

In this example embodiment, a method of which the MN (for example, the main base station 1A described in the example embodiments 1 to 4) selects only one SN (for example, the subordinate base station 1B described in the example embodiments 1 to 4) will be described. The method described in this example embodiment can be applied to the configuration of all the example embodiments mentioned above.

Configuration

A configuration of a wireless communication system according to this example embodiment is the same as that of the wireless communication system 100 according to the example embodiments 1 to 4 (refer to FIG. 1).

Operation Flow

Figure 8:
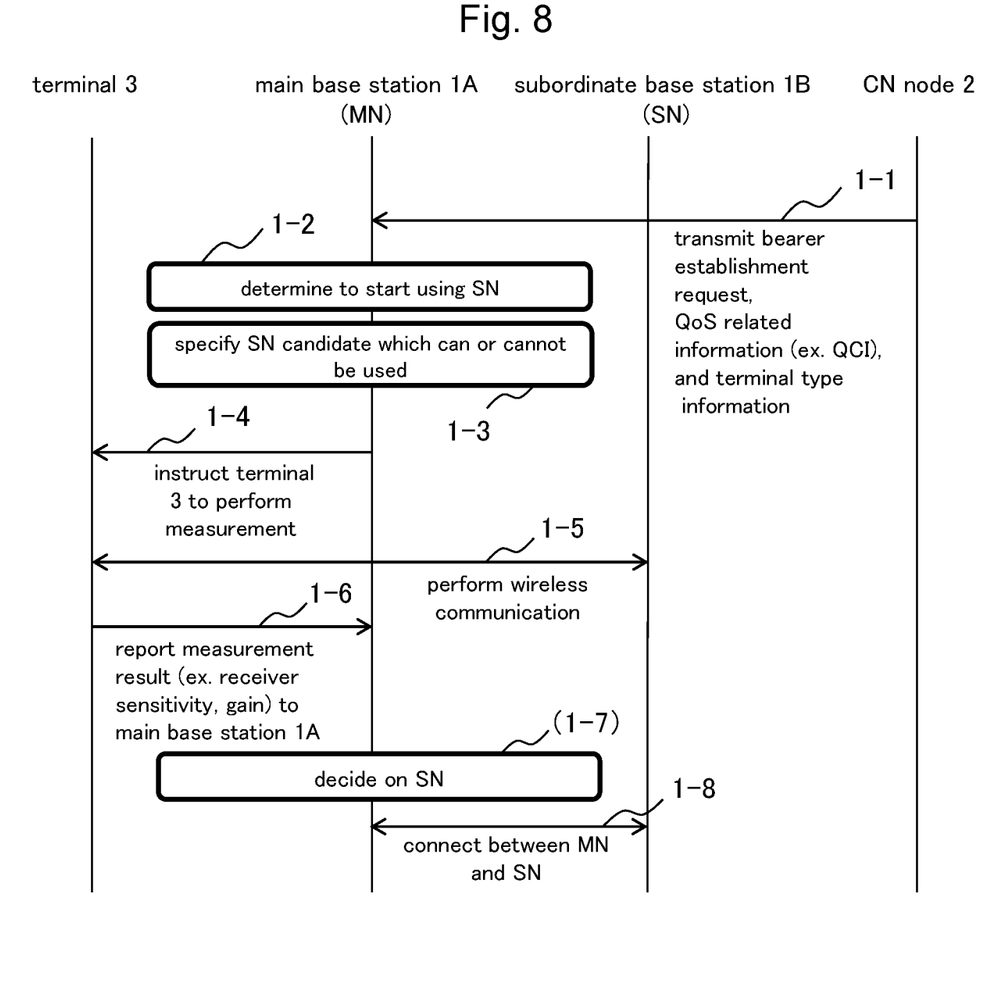
FIG. 8 is a sequence diagram showing a flow of operation of each component of a wireless communication system according to example embodiment 5.

Operation of the wireless communication system according to this example embodiment will be described with reference to FIG. 8. FIG. 8 is a sequence diagram showing a flow of operation of each of the components (the main base stations 1A and 1B, the CN node 2, and the terminal 3) included in the wireless communication system.

As shown in FIG. 8, the CN node 2 transmits a request to establish a communication route (wireless bearer) to the MN, in other words, the main base station 1A in order to connect the terminal 3 to the core network (step 1-1).

The CN node 2 notifies the main base station 1A of information (hereinafter, referred to as QoS related information) related to QoS (quality of service) applied to wireless communication with the terminal 3 and information about the type of the terminal 3. Further, the CN node 2 may transmit information about an attribute of the terminal 3 and/or information about a user attribute to the main base station 1A.

The main base station 1A determines to start using the SN on the basis of a predetermined condition (step 1-2). For example, the main base station 1A may determine the use of the SN on the basis of a data communication amount of the terminal 3 or a type of application used by the terminal 3. However, the condition used when the main base station 1A determines the use of the SN is not limited.

The main base station 1A selects one or more subordinate base stations which can or cannot be used as the SN from the subordinate base station list held by the main base station 1A on the basis of the QoS related information of which the main base station 1A is notified by the CN node 2 (step 1-3). Information about a type and quality of the service that can be provided to the terminal 3 by each subordinate base station may be described in the subordinate base station list.

For example, by referring to the mapping table in which the QoS related information and the subordinate base station are associated with each other, the main base station 1A may select the subordinate base station (for example, the subordinate base station which can provide the communication resource with higher receiver sensitivity or higher gain than a threshold value by the terminal 3) according to the QoS applied to wireless communication with the terminal 3 as the SN.

Alternatively, the main base station 1A may further select one or more subordinate base stations which can or cannot be used from the subordinate base station list on the basis of the information about the type of the terminal 3, the information about the attribute of the terminal 3, and/or the information about the user attribute obtained from the CN node 2.

The main base station 1A instructs the terminal 3 to perform wireless communication between each selected subordinate base station and the terminal 3 and report the level of quality of the wireless communication service which can be provided by the subordinate base station, in other words, the first information (for example, the measurement value of the receiver sensitivity, the gain, or the like) related to QoS, to the main base station 1A (step 1-4).

The terminal 3 performs wireless communication with each subordinate base station according to the instruction from the main base station 1A (step 1-5). The terminal 3 reports the measurement value corresponding to each subordinate base station to the main base station 1A (step 1-6).

The main base station 1A decides on the SN on the basis of the measurement value received from the terminal 3 (step 1-7). For example, the main base stations 1A may select the subordinate base station which can provide the wireless communication service with the highest quality to the terminal 3 as the SN.

The main base stations 1A is wirelessly connected to the SN (in this case, the base station 1B) determined by such method (step 1-8).

When the above-mentioned process has been performed, the operation of the wireless communication system according to this example embodiment ends.

Supplementary Note

One of the example embodiments of the present invention may have the following aspect described as a supplementary note. However, the present invention is not limited to the following supplementary note.

Supplementary Note 1

A wireless communication system in a cellular type wireless communication network, the wireless communication system comprising:
a plurality of base stations performing the wireless communication with a terminal, wherein
the base station includes a first base station set as a node of the wireless communication network, and for setting another base station as a subordinate cell or a subordinate base station, the first base station selects the subordinate cell or the subordinate base station from among either
(a) candidates according to QoS (Quality of Service) applied to the terminal or
(b) candidates according to a type of the terminal.

Supplementary Note 2

The wireless communication system according to Supplementary Note 1, wherein
the candidate of the base station meets a condition that can provide a communication resource used by the terminal can be provided.

Supplementary Note 3

The wireless communication system according to Supplementary Note 2, wherein
the first base station
obtains one of first information related to the QoS applied to wireless communication with the terminal and second information related to the type of the terminal from the wireless communication network, and
selects the subordinate cell or the subordinate base station by using one of the obtained first and second information.

Supplementary Note 4

The wireless communication system according to Supplementary Note 3, wherein
the first base station
holds or obtains determination information required for determining the base station which meets the condition before selecting the subordinate cell or the subordinate base station, and
determines the candidate which meets the condition by using one of the first and second information, and the determination information.

Supplementary Note 5

The wireless communication system according to any one of Supplementary Notes 1-4, wherein
the first base station
sets another base station as a first subordinate cell or a first subordinate base station, and
instructs the first subordinate cell or the first subordinate base station to select a second subordinate cell or a second subordinate base station from among a plurality of the base stations.

Supplementary Note 6

A core network node included in the wireless communication system according to any one of Supplementary Notes 1-5, wherein
the core network node notifies the first base station of one of first information indicating the QoS applied to the terminal and second information indicating the type of the terminal.

Supplementary Note 7

A base station in a cellular type wireless communication network, wherein the base station performs wireless communication with a terminal, and is set as a node of the wireless communication network, and wherein
for setting another base station as a subordinate cell or a subordinate base station in the wireless communication network, the base station selects the subordinate cell or the subordinate base station from among either
(a) candidates according to QoS applied to the terminal or
(b) candidates according to a type of the terminal.

Supplementary Note 8

The base station according to Supplementary Note 7, wherein
the base station performs the wireless communication between the terminal and the candidate and obtains a measurement value obtained as a result of the wireless communication from the terminal, and wherein
the base station selects the subordinate cell or the subordinate base station based on the obtained measurement value.

Supplementary Note 9

The base station according to Supplementary Note 7 or 8, wherein
the base station (i) obtains one of first information indicating the QoS applied to the terminal and second information indicating the type of the terminal from the wireless communication network, (ii) holds or obtains mapping information for deriving a list of the base station which can or cannot be used as the subordinate cell or the subordinate base station from one of the first information and the second information, and (iii) selects the subordinate cell or the subordinate base station by using the list derived by using one of the first and second information, and the mapping information.

Supplementary Note 10

The base station according to any one of Supplementary Notes 7-9, wherein
when the base station sets another base station as a first subordinate base station and additionally determines to add another base station as a second subordinate cell or a second subordinate base station, the base station instructs the first subordinate base station to select the second subordinate cell or the second subordinate base station from among a plurality of the base stations.

Supplementary Note 11

The base station according to Supplementary Note 10, wherein
the base station notifies the first subordinate base station of a list of the base station which can or cannot be used as the second subordinate cell or the second subordinate base station.

Supplementary Note 12

The base station according to Supplementary Note 10, wherein
the base station notifies the first subordinate base station of one of the first information and the second information.

Supplementary Note 13

A base station which is set as the first subordinate base station by the base station according to Supplementary Note 11, wherein
the base station obtains a list of the base station which can or cannot be used as a subordinate cell or a subordinate base station from the base station described in claim 11, and selects the second subordinate cell or the second subordinate base station by using the obtained list.

Supplementary Note 14

A base station which is set as the first subordinate base station by the base station according to Supplementary Note 12, wherein
the base station (i) obtains one of the first information and the second information from the base station according to claim 12, (ii) holds or obtains mapping information for deriving a list of the base station which can or cannot be used as a subordinate cell or a subordinate base station, and (iii) selects the second subordinate cell or the second subordinate base station from the list derived by using one of the first and second information, and the mapping information.

Supplementary Note 15

A method for controlling a wireless communication system, the wireless communication system including a plurality of base stations and forming a cellular type wireless communication network,
the method for controlling the wireless communication system comprising:
performing, by a plurality of the base stations, wireless communication with a terminal,
setting a first base station as a node of the wireless communication network, and
for setting another base station as a subordinate cell or a subordinate base station, selecting the subordinate cell or the subordinate base station from among either
(a) candidates according to QoS applied to the terminal or
(b) candidates according to a type of the terminal.

The invention of the present application has been described above with reference to the example embodiment. However, the invention of the present application is not limited to the above-mentioned example embodiment. Various changes in the configuration or details of the example embodiment can be made by those skilled in the art without departing from the scope of the invention of the present application.

The invention of the present application can be applied to a configuration other than the configuration described in the above-mentioned example embodiments 1 to 5. For example, the method for selecting the subordinate base station (SN) described in the example embodiments 1 to 5 can be adopted when the MN (the main base station 1A) or the SN (the subordinate base station 1B or the subordinate base station 1C) adds the subordinate cell (the base station subordinated to the MN or the SN).

In this configuration, the MN (the main base station 1A) or the SN (the subordinate base station 1B or the subordinate base station 1C) selects the subordinate cell instead of selecting the SN. For example, the MN or the SN may select the subordinate cell from among either (a) the candidates for the subordinate cell according to the QoS applied to the terminal 3 or (b) the candidates for the subordinate cell according to the type of the terminal 3.

Alternatively, the MN (the main base station 1A) or the SN (the subordinate base station 1B or the subordinate base station 1C) may determine the candidate for the subordinate cell by using the mapping information described in the example embodiments 3 and 4 and select the subordinate cell from among the candidates for the subordinate base station that are determined.

REFERENCE SIGNS LIST 100 wireless communication system
900 wireless communication system
1A to 1C base station
2 CN node
3 terminal

The invention claimed is:

1. A base station which is set as a first subordinate base station by a selecting base station in a cellular type wireless communication network, wherein
the selecting base station performs wireless communication with a terminal, and is set as a node of the wireless communication network, and wherein
for setting another base station as a subordinate cell or a subordinate base station in the wireless communication network, the selecting base station selects the subordinate cell or the subordinate base station from among either
(a) candidates according to QoS applied to the terminal or
(b) candidates according to a type of the terminal, and wherein
when the selecting base station sets another base station as the first subordinate base station and additionally determines to add another base station as a second subordinate cell or a second subordinate base station, the base station instructs the first subordinate base station to select the second subordinate cell or the second subordinate base station from among a plurality of the base stations, and wherein
the selecting base station notifies the first subordinate base station of one of first information related to the QoS applied to wireless communication with the terminal and second information related to the type of the terminal from the wireless communication network, and wherein
the base station (i) obtains one of the first information and the second information from the selecting base station, (ii) holds or obtains mapping information for deriving a list of the base station which can or cannot be used as a subordinate cell or a subordinate base station, and (iii) selects the second subordinate cell or the second subordinate base station from the list derived by using one of the first and second information, and the mapping information.

2. The base station according to claim 1, wherein
the selecting base station performs the wireless communication between the terminal and the candidate and obtains a measurement value obtained as a result of the wireless communication from the terminal, and wherein
the selecting base station selects the subordinate cell or the subordinate base station based on the obtained measurement value.

3. The base station according to claim 1, wherein
the selecting base station (i) obtains one of the first information and the second information, (ii) holds or obtains mapping information for deriving a list of the base station which can or cannot be used as the subordinate cell or the subordinate base station from one of the first information and the second information, and (iii) selects the subordinate cell or the subordinate base station by using the list derived by using one of the first and second information, and the mapping information.

* * * * *